United States Patent [19]
Filipowski et al.

[11] Patent Number: 5,529,437
[45] Date of Patent: Jun. 25, 1996

[54] GUIDANCE SYSTEM AND METHOD FOR KEEPING A TUNNEL BORING MACHINE CONTINUOUSLY ON A PLAN LINE

[76] Inventors: Mark S. Filipowski, 1107 Hillcrest Blvd., Millbrae, Calif. 94030; Steven R. Wardwell, 559 Terrace Ave., Half Moon Bay, Calif. 94019; Michael L. Shank, 3 Cherrymoor Dr., Englewood, Colo. 08110

[21] Appl. No.: 304,858

[22] Filed: Sep. 13, 1994

[51] Int. Cl.[6] .............................. E21D 9/06; G01B 11/27
[52] U.S. Cl. .......................... 405/143; 299/1.3; 356/153
[58] Field of Search .................... 299/1.4, 1.3; 405/143; 250/203.1, 215; 356/153

[56] References Cited

U.S. PATENT DOCUMENTS

| | | | |
|---|---|---|---|
| 3,321,248 | 5/1967 | Williamson et al. | 299/1.3 |
| 3,484,136 | 12/1969 | Colson | 405/143 X |
| 4,392,744 | 7/1983 | Tatsuhama et al. | 299/1.3 X |

FOREIGN PATENT DOCUMENTS

| | | | |
|---|---|---|---|
| 235793 | 9/1989 | Japan | 405/143 |
| 1147961 | 4/1969 | United Kingdom | 299/1.3 |

*Primary Examiner*—David J. Bagnell
*Attorney, Agent, or Firm*—Edwin H. Crabtree; Donald W. Margolis; Ramon L. Pizarro

[57] ABSTRACT

A guidance system and method for keeping a tunnel boring, machine continuously on a plan line. The guidance system requires no machine operator calculations and provides the boring machine operator with a graphic display of past, present and projected positions of the boring machine from a horizontal and vertical perspective. The system uses a laser beam transmitter placed to the rear of the tunnel boring machine along with a front opaque target with a horizontal and vertical cross-hair and a rear transparent target with a horizontal and vertical cross-hair. The front and rear targets are disposed on the front and the rear of the boring machine. Also, an on-board programmable computer is installed on the boring machine for imputing data as to horizontal offset and vertical offset readings from the front and rear targets as the boring machine advances forward. Typically the boring machine moves forward in increments of four feet with offset readings taken by the operator after each increment. The offsets are measured in feet up to two decimal places with the readings based on measured positions being either right or left of the vertical cross-hair and above or below the horizontal cross-hair of the front and rear targets. Further, the on-board computer is programmed to store and provide a laser alignment check for verifying laser setup information and to graphically display alignment errors during a change in the setup of the laser beam transmitter by a survey crew.

20 Claims, 6 Drawing Sheets

GUIDANCE SYSTEM AND METHOD FOR KEEPING A TUNNEL BORING MACHINE CONTINUOUSLY ON A PLAN LINE

BACKGROUND OF THE INVENTION (a) Field of the Invention

This invention relates a guidance system for boring equipment and more particularly, but not by way of limitation, to a system for keeping a tunnel boring machine continuously on a plan line by providing a boring machine operator with a graphic display of past, present and projected positions of the boring machine. The new guidance system, while used primarily for tunneling, can also be used equally well in shaft sinking, mining and other boring applications.

(b) Discussion of Prior Art

In U.S. Pat. Nos. 3,707,330 to Pine and 3,484,136 to Colson, a method and apparatus for guiding a tunneling machine with a light beam and a pair of targets is disclosed. The targets are mounted on the equipment and designed to return to an operative position when the machine rolls about its longitudinal axis. U.S. Pat. No. 3,321,248 to Williamson et al. also describes the use of a pair of targets on a tunneling machine with impingement using a laser beam.

U.S. Pat. No. 3,517,966 to Montacie describes a guidance system for a boring machine wherein the laser source is used in conjunction with an optical system mounted on the machine. U.S. Pat. Nos. 3,498,673 to Ledray et al. and 3,482,103 to Martinsen describe the use of a mirror reflector and photocells with a light source in guiding a tunneling machine. Further, U.S. Pat. Nos. 4,656,743 to Thiemann et al., 4,273,468 to Cyfka and 3,560,753 to Beug et al., describe different types of system dealing with the position or displacement of a boring machine along with a tunnelling shield.

None of the above mentioned prior art patents specifically disclose the unique features, advantages and method steps of the subject system for keeping a tunnel boring machine continuously on a plan line.

SUMMARY OF THE INVENTION

In view of the foregoing, it is a primary object of the invention to provide a fast and reliable method for keeping a tunnel boring machine on a plan line. The new system eliminates the need of the machine operator having to make machine position calculations which heretofore caused confusion and operator error.

Another object of the present invention is, through the use of an on-board computer, graphic displays are presented of past, present and projected positions of the tunnel boring machine from both a horizontal and vertical perspective, Still another object of the system is because no calculations are required on the part of the machine operator and the graphic displays are very clear and understandable, operator error is virtually eliminated and the speed of the boring operation is greatly increased.

Yet another object of the invention is due to the tunnel boring machine being on the plan line continually, productivity is improved and costly mistakes of having the boring machine off line are eliminated.

A further object of the invention and through the use of the on-board computer a laser alignment check is provided for verifying alignment errors when it is necessary for a survey crew to change the location of the laser beam transmitter.

The guidance system for a tunnel boring machine uses a laser beam transmitter placed to the rear of the tunnel boring machine. A front opaque target with a horizontal and vertical cross-hair and a rear transparent target with a horizontal and vertical cross-hair are disposed on the front and the rear of the boring machine. Also, an on-board programmable computer is installed on the boring machine next to the machine operator for imputing data as to horizontal offset and vertical offset readings from the front and rear targets as the boring machine advances forward. The offsets are measured in feet up to two decimal places with the readings based on measured positions being either right or left of the vertical cross-hair and above or below the horizontal cross-hair of the front and rear targets. Further, the on-board computer is programmed to store and provide a laser alignment check for verifying laser setup information and to graphically display alignment errors during a change in the setup of the laser beam transmitter by a survey crew.

These and other objects of the present invention will become apparent to those skilled in the art of tunnel boring from the following detailed description, showing the contemplated novel construction, combination, and elements as herein described, and more particularly defined by the appended claims, it being understood that changes in the precise embodiments to the herein disclosed invention are meant to be included as coming within the scope of the claims, except insofar as they may be precluded by the prior art.

BRIEF DESCRIPTION OF THE DRAWINGS

The accompanying drawings illustrate complete preferred embodiments of the present invention according to the best modes presently devised for the practical application of the principles thereof, and in which.

DESCRIPTION OF THE PREFERRED EMBODIMENTS

Figure 1:
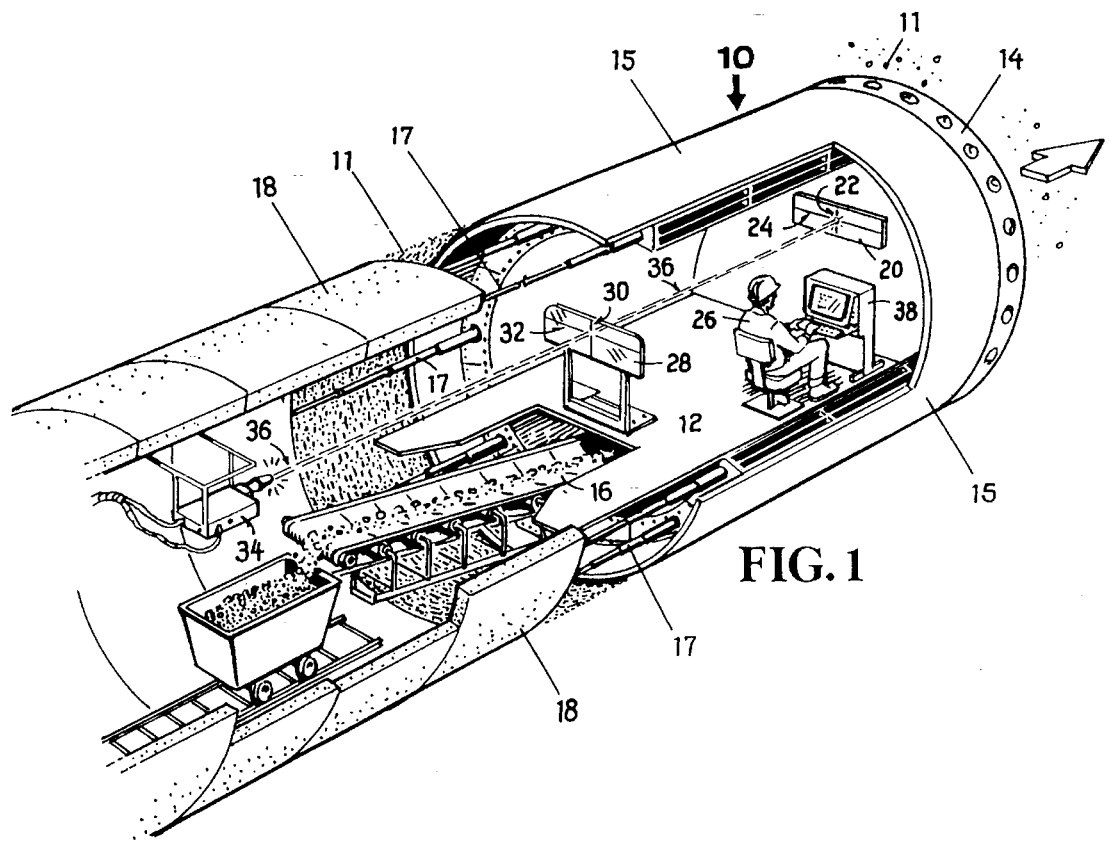
FIG. 1 is a perspective view of a view of a portion of a tunnel cut away to expose a tunnel boring machine guided by a laser beam from a laser beam transmitter.

In FIG. 1, a perspective view of a tunnel boring machine is shown having a general reference numeral 10. The boring machine 10 is used when tunneling through different types of rock forming a tunnel 11. A similar machine such as a soft ground shield is used for tunneling through sand. The subject guidance system as discussed herein is used equally well with both types of equipment and as mentioned above can also be used with other types of boring equipment used in mining and tunneling operations.

Broadly, the boring machine 10 includes a platform 12 and rotating cutter heads 14 mounted in the front of a cylindrical shield 15. The platform 12 is received inside the cylindrical shield 15. A conveyor 16 is mounted to the rear and below the platform 12 for transporting the cut rock away from the boring machine 10. As the boring machine 10 advances forward, the tunnel 11 is lined with semi-circular concrete segments 18 which are typically 4 feet in width. Hydraulic jacks 17, mounted next to the cutting heads 14, are used to push off the most recently installed concrete segments 18 to move or "shove" the boring machine 10 forward. Also the hydraulic jacks 17 act to guide the machine either to the left or right when making a curve in the tunnel and move the machine up or down depending on the slope of the tunnel 1. A "shove" quite often corresponds with the width of a segment or in a range of 4 feet. When four of the segments 18 are joined together, they form a ring for lining the circumference of the tunnel 11. As the tunnel 11 is created, the rings formed by the four concrete segments 18 are attached to each other forming a tunnel lining. The circumference of the tunnel 11 way vary depending on the type of tunnel and its use, the size and length of tunnel. In this example, the cutter heads 14 have a diameter in a range of 18 feet and the completed tunnel 11 formed by the segment rings have a diameter of 16½ feet. In FIG. 1 for clarity, a portion of the segments 18 and the tunnel 11 have been cut away to expose the boring machine 10.

Mounted near the front of the boring machine 10 and centered thereon is a front opaque target 20 with a vertical cross-hair 22 and a horizontal cross-hair 24. The front target 20 is disposed above the head of a machine operator 26. The operator 26 and any other assistants are protected by the cylindrical shield 15. A portion of the shield 15 has been cut away to illustrate the front target 20 and the position of the machine operator 26. The shield 15 may vary in size and in this example has a diameter of 18 feet and a length of 18½ feet. The distance from the front target 20 and the leading edge of the shield is in a range of 13 feet.

Mounted at the rear of the boring machine 10 is a rear transparent target 28 having a vertical cross-hair 30 and horizontal cross-hair 32. The distance between the front target 20 and the rear target 28 is in a range of 13 feet although this distance will vary depending on the type of boring machine used and the diameter of the tunnel 11. To the rear of the boring machine 10 is a laser beam transmitter 34 for transmitting a laser light beam 36, shown in dotted lines, through the rear transparent target 28 and on the front opaque target 20.

Figure 2:
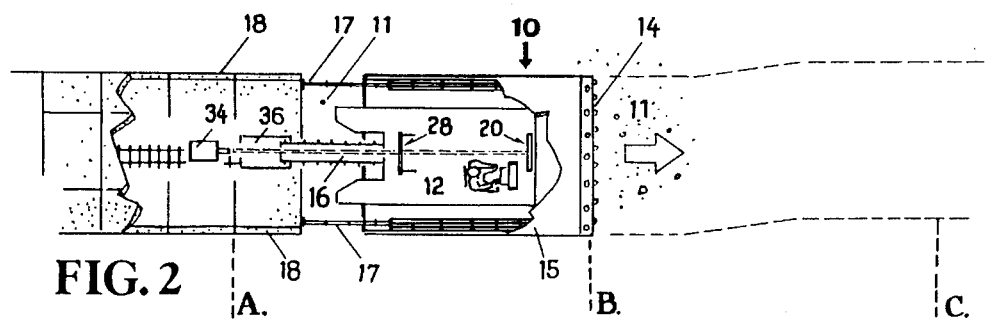
FIG. 2 is a top view of the tunnel boring machine completing the tunnel from Point A to Point B and making a left hand turn toward Point C.
Figure 3:
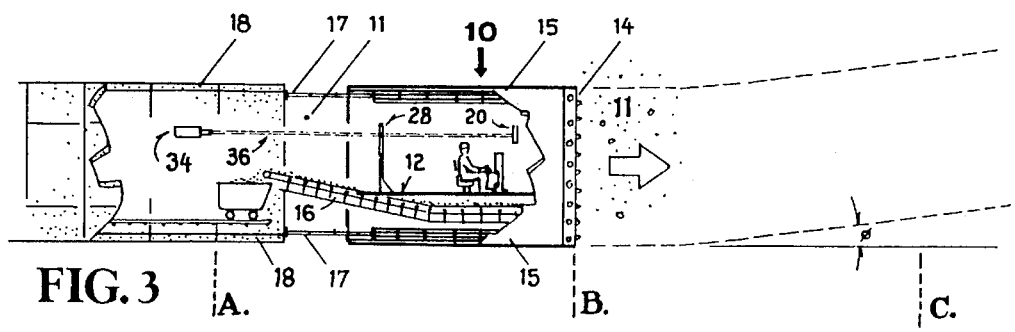
FIG. 3 is a side view of the tunnel boring machine shown in FIG. 2 and moving from a horizontal grade between Point A to Point B and moving up a grade $\phi$ toward Point C.

In FIG. 2 a top view of the subject boring machine 10 is shown having moved from Point A to Point B. At Point B, the machine 10 will be manipulated by the hydraulic cylinders and urged into a left hand curve as it moves toward Point C. At Point B, or before reaching Point B, the surveyors of the tunnel boring crew will move the laser beam transmitter 28 to compensate for the curve toward Point C. FIG. 3 illustrates a side view of the boring machine 10 shown in FIG. 2 wherein the machine has moved from Point A to Point B along a horizontal grade. When the machine 10 reaches Point B it will be urged upwardly by the hydraulic cylinders along a slope indicated by the Greek letter phi or $\phi$ until it reaches Point C.

Referring to FIGS. 1–3, the operator 26 is shown seated next to an on-board programmable lap top computer 38. One of the operators duties is to measure both the horizontal and vertical offset readings derived from the light beam 36 impinging on the front and rear targets 20 and 28. The computer 38 is shown in FIG. 1 to the side of the rear target 28 along with the associated equipment such as a viewing screen, etc. The computer may also be placed under the rear target 28 or any other nearby location on the frame 12 as long as the equipment does not interfere with the operation of the boring machine 10 and the machine operator 26.

Prior to the start of the tunnel operation, the computer 38 is programmed with data for establishing the plan line and determining the actual line position of the tunnel boring machine 10 as it moves forward installing one segment at a time. Also, the computer 38 will log as-built data. Further the data imputed will include time and date, readings related to the roll tubes of the machine as integers, bearing of the laser beam transmitter as to Northing and Easting in the northern hemisphere with up to three decimal places, elevation in feet with up to three decimal places, azimuth of the grade line of the machine in degrees, minutes and seconds and slope of the grade line of the machine in degrees, minutes and seconds. The roll tubes mentioned above indicate how much the machine has rolled about its longitudinal axis.

Because the concrete segments 18 are installed every four feet, the machine operator 26 after completing each segment measures the horizontal and vertical offsets in feet up to two decimal places In the following tables, "R" and "L" signify "right" and "left" of the vertical cross hairs 22 and 30 of the front and rear targets 20 and 28. Likewise, "A" and "B" signify "above" and "below" the horizontal cross-hairs 24 and 32 of the front and rear targets 20 and 28.

HORIZONTAL AND VERTICAL ALIGNMENT OF BORING MACHINE

Figure 4:
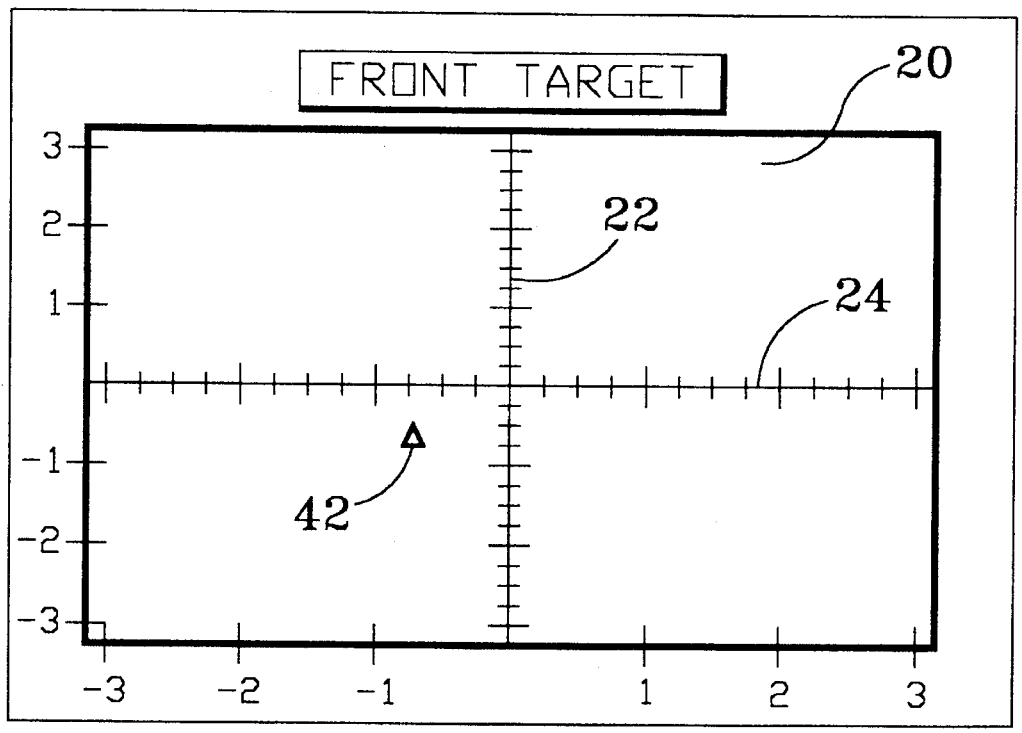
FIGS. 4 and 5 display a view of the front and rear targets mounted on the tunnel boring machine from the operator's perspective, between the targets.

In FIG. 4, the front target 20 is shown having a dimension of 6 feet by 6 feet with cross-hairs 22 and 24. This drawing illustrates where the laser beam 36 impinges the front target 20 when Segment No. 21 is in the shield 15. The actual reading, as measured and imputed by the operator and indicated by a triangular mark 42, is 0.60 L or 0.60 feet to the left of the vertical cross-hair 22 and the actual reading is 0.20 B or 0.20 feet below the horizontal cross-hair 24.

Figure 5:
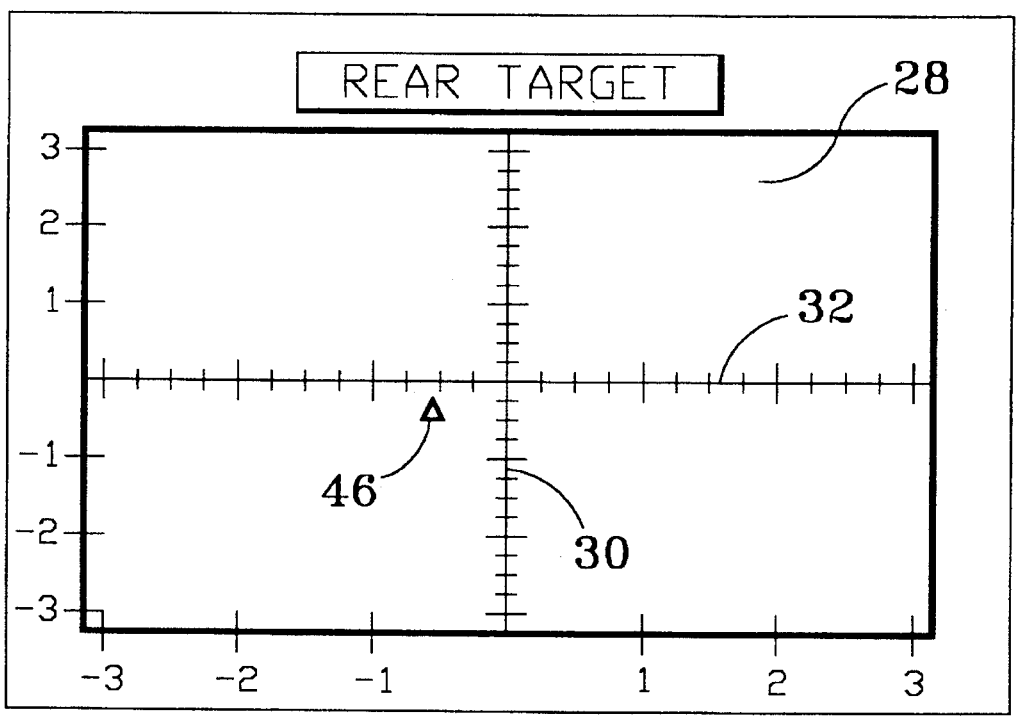

In FIG. 5, the rear transparent target 28 is shown having a dimension of 6 feet by 6 feet with cross-hairs 30 and 32. This drawing illustrates where the laser beam 36 impinges the rear target 28 when Segment No. 21 is in the shield 15. The actual reading, as measured and imputed by the operator and indicated by a triangular mark 46, is 0.40 L or 0.40 feet to the left of the vertical cross-hair 30 and an actual reading is 0.15 B or 0.15 feet below the horizontal cross-hair 32.

To maintain the tunnel boring machine 10 moving along the plan line and in a straight line or through a curved line, both the front and rear targets 20 and 28 are necessary to determine the position of the actual line between two points produced by the laser light beam 36 on the targets. This actual line of the position of the machine, which will be discussed in the following figures, can be extended to the front and the rear of the tunnel boring machine 10. Information related to the length, width and various specifications of the tunnel boring machine 10 are fed into the program of the computer 38 and used to make necessary calculations and corrections for generating proper graphic displays of past, present and projected positions of the tunnel boring machine 10 to assist the machine operator 26 in properly guiding the machine 10.

Figure 6:
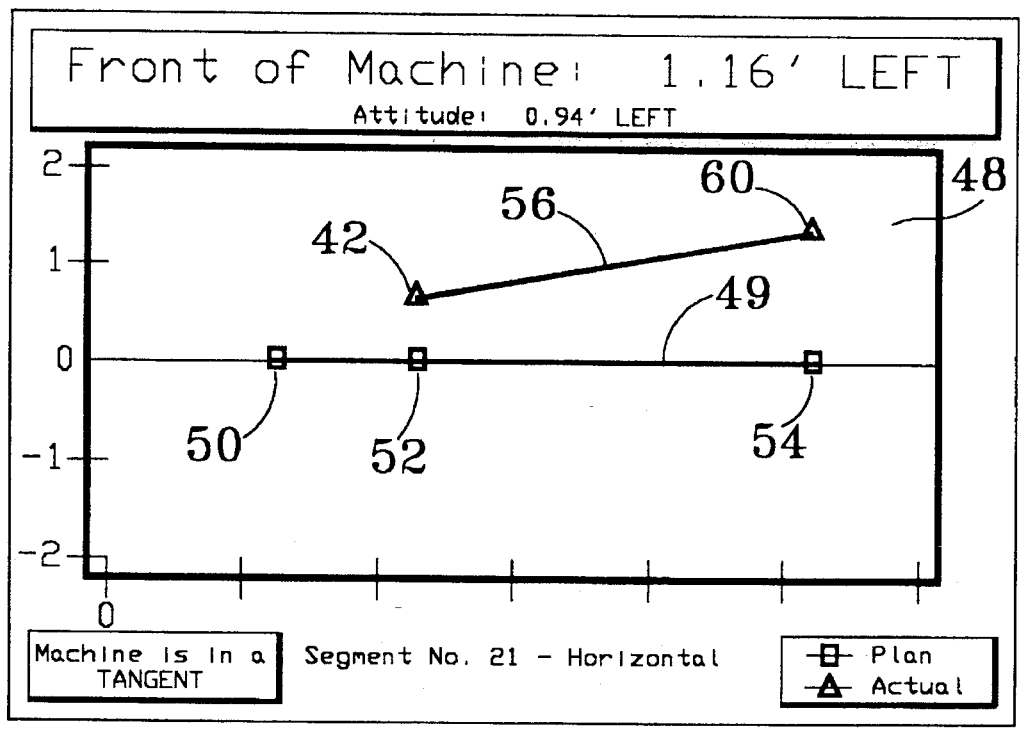
FIG. 6 illustrates a graphic display of an actual line position as to horizontal offset from the front target to the front of the tunnel boring machine when Segment No. 21 is in the shield.

FIG. 6 illustrates a graphic display 48 of the horizontal position and attitude of the boring machine 10 when Segment No. 21 is in the shield 15 as discussed in FIGS. 4–5. The graphic display 48 may be in a form of a hard copy from a printer or shown on a computer screen. In this display, a plan line 49 is shown as a horizontal line and a rectangular mark 50 indicates the plan position of the rear of the machine 10, a rectangular mark 52 indicates the plan location of the front target 20 and a rectangular mark 54 indicates the plan location of the front of the machine 10.

An actual line 56 of the machine 10 when Segment No. 21 is in the shield 15 is shown in FIG. 6 between the triangular mark 42 which indicates the actual location of the front target 20 and a triangular mark 60 which indicates the actual location of the front of the machine 10. The actual line 56 is an extension of an actual line which is generated using the input of measurements read on the front and rear targets 20 and 28 as discussed under FIGS. 4–5. As mentioned above, the laser beam 36 impinges the front target at 0.60 L or 0.60 feet left of the vertical cross-hair 22. From computer calculations, it is determined that the front of the machine 10 is 1.16 L or 1.16 feet left of the plan position. From viewing the graphic display 48, the machine operator 26 now knows that during the boring of the tunnel 11 for Segment 22, the tunnel boring machine needs to be urged toward the right to move the machine 10 back toward the plan line 49.

Figure 7:
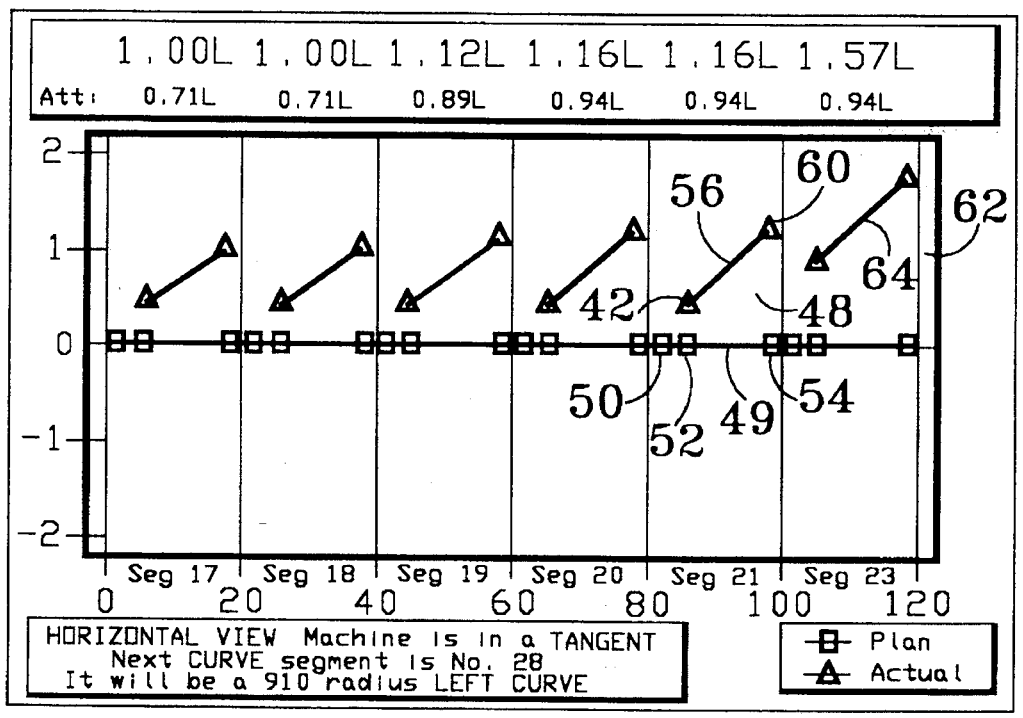
FIG. 7 illustrates a graphic display of actual line positions as to horizontal offset from the front target to the front of the tunnel boring machine for the past four shoves "Segments 17–20", current shove "Segment No. 21" and future shove "Segment 23".

In FIG. 7, a horizontal graphic display 62 is shown of four previous shoves for Segments 17–20, the current shove for Segment 21, and a projection of one shove in the future for Segment 23. Segment 22 is not shown in the drawings. Note Segment 21 in this drawing is the same as FIG. 6. The graphic display 62 quickly illustrates to the operator 26, that the four previous segments and the current Segment 21 continue to be to the left of the plan line with the front of the machine 10 being more than 1.00 feet to the left of the horizontal plan line 49. Also, by looking at the projection of Segment 23 in the future the front of the machine will be 1.57 L or 1.57 to the left of plan line 49 as indicated by actual line 64. Therefore, based on the projection of Segment 23, corrective action must be taken to move the tunnel boring machine 10 to the right and toward the horizontal plan line 49.

Figure 8:
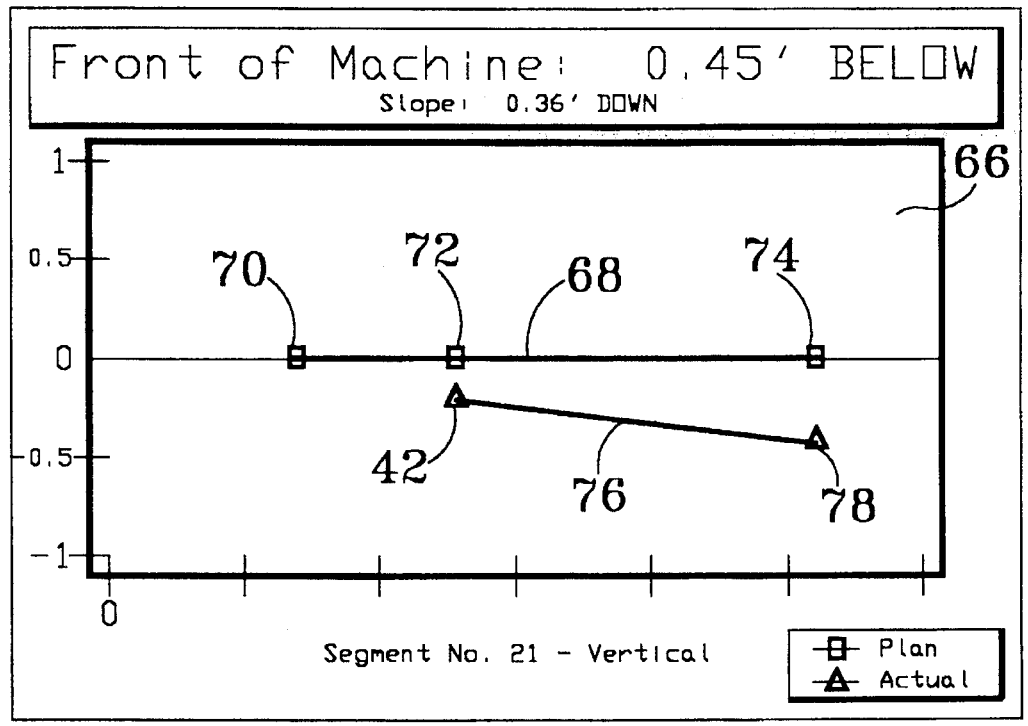
FIG. 8 illustrates a graphic display of an actual line position as to vertical offset from the front target to the front of the tunnel boring machine when Segment No. 21 is in the shield.

FIG. 8 illustrates a graphic display 66 of the vertical position and slope of the boring machine 10 when Segment No. 21 is in the shield 15 discussed in FIGS. 4–5. The graphic display 66 may also be in a form of a hard copy from a printer or shown on a computer screen. In this drawing, a plan line 68 is shown as a horizontal line and a rectangular mark 70 indicates the plan position of the rear of the machine 10, a rectangular mark 72 indicates the plan location of the front target 20 and a rectangular mark 74 indicates the plan location of the front of the machine 10.

An actual line 76 of the machine 10 for segment 21 is shown in FIG. 8 between the triangular mark 42 which indicates the actual location of the front target 20 and a triangular mark 78 which indicates the actual location of the front of the machine 10. The actual line 76 is an extension of an actual line which is generated using the input of measurements read on the front and rear targets 20 and 28 as discussed under FIGS. 4–5. As mentioned above, the location of the laser beam 36 impingement on the front target is 0.20 B or 0.20 feet below the plan line. By projecting the line 76, the position of the front of the machine is calculated to be 0.45 B or 0.45 feet below the plan line. From viewing the graphic display 66, the machine operator 26 knows that during the boring of the tunnel 11 for Segment 22, the tunnel boring machine 10 needs to be urged slightly upward to move the machine back toward the plan line 68.

Figure 9:
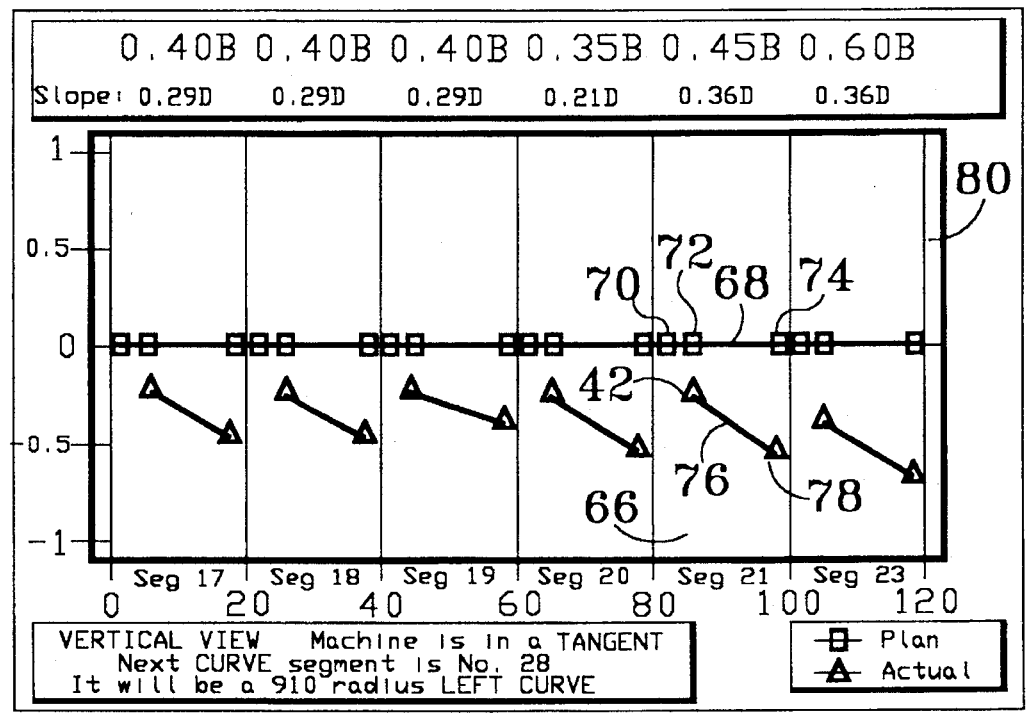
FIG. 9 illustrates a graphic display of actual line positions as to vertical offset from the front target to the front of the tunnel boring machine for the past four shoves "Segments 17–20", current shove "Segment No. 21" and future shove "Segment 23".

In FIG. 9, a vertical graphic display 80 is shown of four previous shoves for Segments 17–20, the current shove for Segment 21, and a projection of one shove in the future for Segment 23. Segment 22 is not shown in the drawings. Note Segment 21 in this drawing is the same as FIG. 8. The graphic display 80 illustrates to the operator 26, that the four previous segments and the current Segment 21 continue to be below the plan line with the front of the machine 10 being in a range of 0.50 feet below the horizontal plan line 68. Also, by looking at the projection of Segment 23 in the future the front of the machine will be 0.60 B or 0.60 feet below the plan line 68. Therefore based on the projection of Segment 23 and mentioned above, the operator should make corrections to move the tunnel boring machine slightly upward toward the horizontal plan line 68.

In FIGS. 7 and 9, at the bottom of the graphic displays 62 and 80, the machine operator is alerted by the computer's program that at Segment 28 a curve will start and it will be a 910 radius Left Curve.

In the following Table A an "As-Built Log" is shown for a series of Segments 1–40 of a tunnel boring job in progress during the month of May, 1994. Table A has been shortened for ease in reading and corresponds to the first 40 segments shogun in FIGS. 10 and 11.

TABLE A

| Segment | | | | | | Offsets from Plan | | Machine | Machine | Laser Co-ordinates: | | |
|---|---|---|---|---|---|---|---|---|---|---|---|---|
| Number | Date | Time | Northing | Easting | Grade | Horizontal | Vertical | Azimuth | Slope | N | E | G |
| 1 | 05/10/94 | 11:06 AM | 474,912.487 | 1,427,068.001 | 32.649 | 0.14 R | 0.52 A | 4.852108 | 0.013453 | | | |
| 2 | 05/10/94 | 11:07 AM | 474,913.020 | 1,427,064.036 | 32.641 | 0.14 R | 0.52 A | 4.852108 | 0.013453 | | | |

TABLE A-continued

| Segment | | | | | | Offsets from Plan | | Machine | Machine | Laser Co-ordinates: | | |
|---|---|---|---|---|---|---|---|---|---|---|---|---|
| Number | Date | Time | Northing | Easting | Grade | Horizontal | Vertical | Azimuth | Slope | N | E | G |
| 3 | 05/10/94 | 11:07 AM | 474,913.552 | 1,427,060.071 | 32.633 | 0.14 R | 0.52 A | 4.852108 | 0.013453 | | | |
| 4 | 05/10/94 | 11:08 AM | 474,914.095 | 1,427,056.106 | 32.715 | 0.15 R | 0.61 A | 4.858290 | 0.007271 | | | |
| 5 | 05/10/94 | 11:09 AM | 474,914.659 | 1,427,052.145 | 32.757 | 0.18 R | 0.66 A | 4.857518 | 0.000316 | | | |
| 6 | 05/10/94 | 11:10 AM | 474,915.223 | 1,427,048.184 | 32.756 | 0.21 R | 0.66 A | 4.856745 | 0.002634 | | | |
| 7 | 05/10/94 | 11:11 AM | 474,915.772 | 1,427,044.221 | 32.766 | 0.23 R | 0.68 A | 4.852108 | 0.003407 | | | |
| 8 | 05/10/94 | 11:12 AM | 474,916.343 | 1,427,040.261 | 32.782 | 0.27 R | 0.71 A | 4.852881 | 0.001089 | | | |
| 9 | 05/10/94 | 11:13 AM | 474,916.848 | 1,427,036.292 | 32.774 | 0.24 R | 0.71 A | 4.852108 | 0.001089 | | | |
| 10 | 05/10/94 | 11:13 AM | 474,917.410 | 1,427,032.330 | 32.818 | 0.27 R | 0.76 A | 4.852108 | −0.000457 | | | |
| 11 | 05/10/94 | 11:18 AM | 474,917.946 | 1,427,028.365 | 32.826 | 0.27 R | 0.77 A | 4.849790 | −0.004321 | | | |
| 12 | 05/10/94 | 12:00 PM | 474,918.493 | 1,427,024.402 | 32.837 | 0.29 R | 0.79 A | 4.853654 | −0.009730 | | | |
| 13 | 05/10/94 | 01:15 PM | 474,919.042 | 1,427,020.439 | 32.812 | 0.30 R | 0.78 A | 4.855972 | −0.017456 | | | |
| 14 | 05/10/94 | 02:20 PM | 474,919.606 | 1,427,016.477 | 32.756 | 0.34 R | 0.73 A | 4.848244 | −0.000457 | | | |
| 15 | 05/10/94 | 03:30 PM | 474,920.105 | 1,427,012.508 | 32.743 | 0.30 R | 0.72 A | 4.844380 | −0.003548 | | | |
| 16 | 05/10/94 | 04:24 PM | 474,920.640 | 1,427,008.543 | 32.740 | 0.31 R | 0.73 A | 4.842835 | −0.006639 | | | |
| 17 | 05/10/94 | 05:08 PM | 474,921.160 | 1,427,004.575 | 32.680 | 0.29 R | 0.68 A | 4.838198 | −0.005093 | | | |
| 18 | 05/16/94 | 08:47 AM | 474,921.712 | 1,427,000.613 | 32.459 | 0.31 R | 0.46 A | 4.845153 | 0.002634 | | | |
| 19 | 05/16/94 | 12:25 PM | 474,922.198 | 1,426,996.641 | 31.996 | 0.26 R | 0.01 A | 4.849790 | −0.006639 | | | |
| 20 | 05/16/94 | 12:43 PM | 474,922.708 | 1,426,992.673 | 32.000 | 0.24 R | 0.02 A | 4.851336 | −0.008184 | | | |
| 21 | 05/16/94 | 02:04 PM | 474,923.247 | 1,426,988.708 | 31.959 | 0.25 R | 0.01 B | 4.853654 | −0.005866 | | | |
| 22 | 05/16/94 | 03:49 PM | 474,923.776 | 1,426,984.742 | 31.946 | 0.24 R | 0.02 B | 4.849790 | −0.002775 | | | |
| 23 | 05/18/94 | 07:59 AM | 474,924.279 | 1,426,980.773 | 31.931 | 0.21 R | 0.03 B | 4.849790 | 0.001862 | | | |
| 24 | 05/18/94 | 09:57 AM | 474,924.826 | 1,426,976.809 | 31.936 | 0.23 R | 0.01 B | 4.840517 | −0.006639 | | | |
| 25 | 05/18/94 | 11:09 AM | 474,925.312 | 1,426,972.837 | 31.857 | 0.18 R | 0.08 B | 4.838971 | −0.005866 | | | |
| 26 | 05/18/94 | 01:25 PM | 474,925.819 | 1,426,968.868 | 31.791 | 0.16 R | 0.14 B | 4.842835 | −0.001229 | | | |
| 31 | 05/23/94 | 02:26 PM | 474,928.139 | 1,426,949.019 | 31.562 | 0.05 L | 0.33 B | 4.812700 | 0.004953 | | | |
| 32 | 05/24/94 | 07:46 AM | 474,928.516 | 1,426,945.057 | 31.603 | 0.12 L | 0.28 B | 4.808839 | 0.005726 | | | |
| 33 | 05/24/94 | 11:30 AM | 474,928.915 | 1,426,941.097 | 31.748 | 0.16 L | 0.13 B | 4.803434 | 0.010362 | | | |
| 34 | 05/24/94 | 11:32 AM | 474,929.288 | 1,426,937.136 | 31.763 | 0.20 L | 0.11 B | 4.802666 | 0.008044 | | | |
| 35 | 05/24/94 | 11:34 AM | 474,929.639 | 1,426,933.172 | 31.753 | 0.25 L | 0.11 B | 4.802672 | 0.009589 | | | |
| 36 | 05/24/94 | 11:36 AM | 474,930.007 | 1,426,929.211 | 31.745 | 0.27 L | 0.11 B | 4.798043 | 0.009589 | | | |
| 37 | 05/24/94 | 12:47 PM | 474,930.392 | 1,426,925.250 | 31.749 | 0.25 L | 0.10 B | 4.795735 | 0.008044 | | | |
| 38 | 05/27/94 | 09:38 AM | 474,930.815 | 1,426,921.220 | 31.760 | 0.18 L | 0.08 B | 4.770160 | 0.010362 | | | |
| 39 | 05/27/94 | 09:39 AM | 474,931.084 | 1,426,917.242 | 31.772 | 0.24 L | 0.06 B | 4.770158 | 0.010362 | | | |
| 40 | 05/27/94 | 09:40 AM | 474,931.363 | 1,426,913.265 | 31.745 | 0.28 L | 0.08 B | 4.770157 | 0.009589 | | | |

Figure 10:
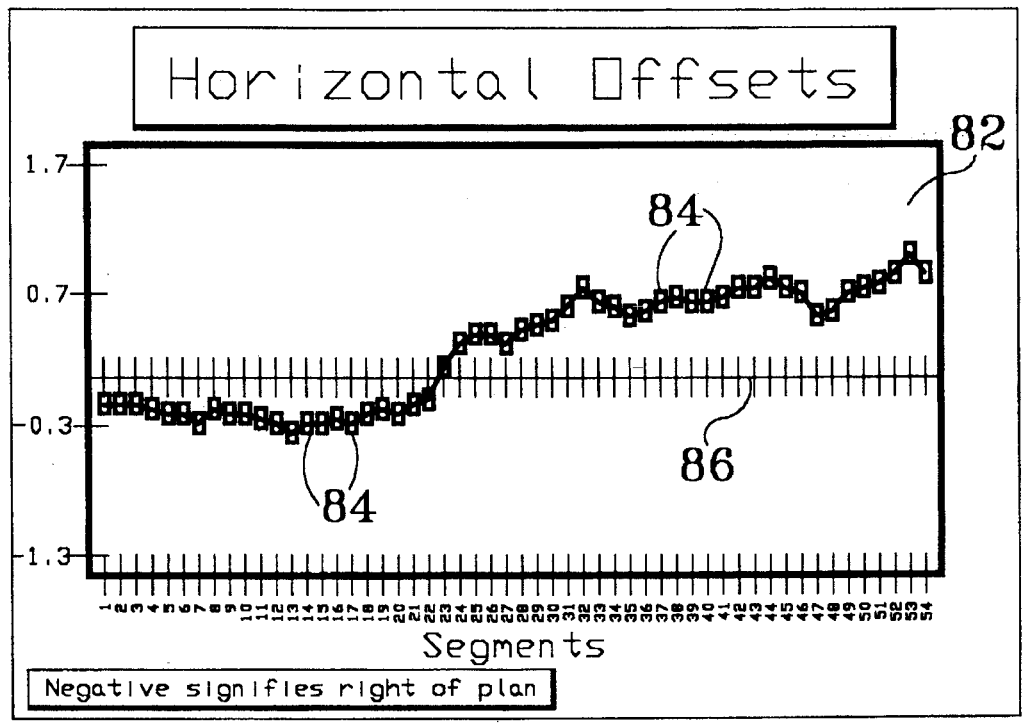
FIGS. 10 and 11 illustrate graphic displays of a series of horizontal and vertical offsets of over 140 rings during a tunnel boring operation.
Figure 11:
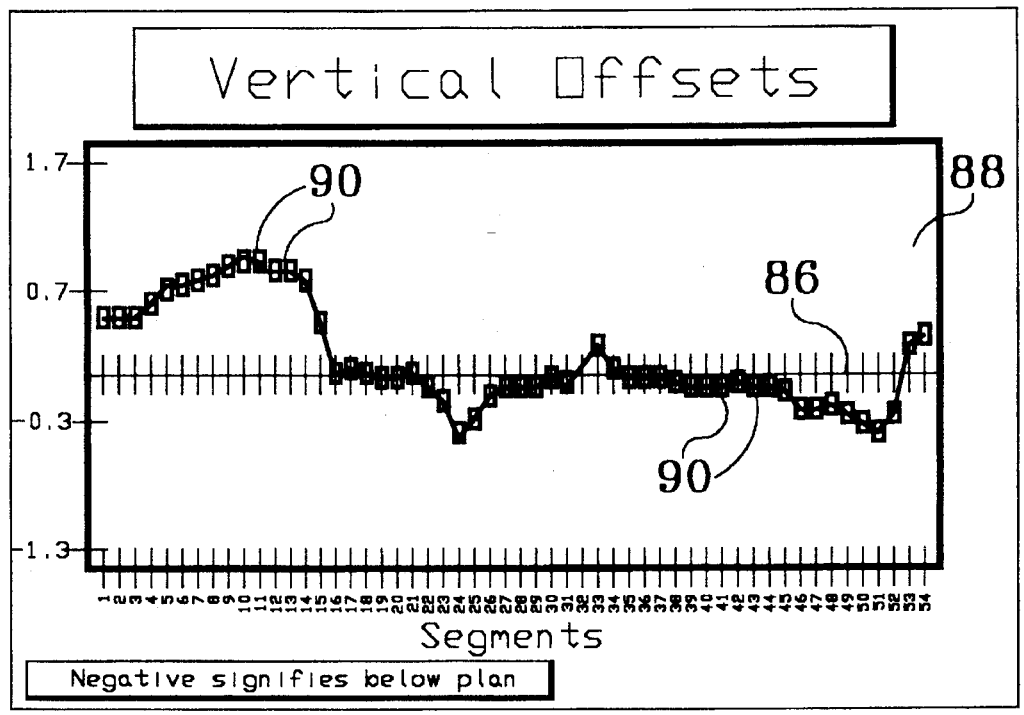

FIG. 10 illustrates a graphic display 82 of a series of horizontal offsets shown as an actual line 84 and a plan line 86. FIG. 11 illustrates a graphic display 88 of a series of vertical offsets shown as an actual line 90 and the plan line 86. The graphic displays 82 and 88 illustrate over 140 segments. The bottom of the graph only lists the first 9 segments.

Referring now to Table A, the following information was imputed from target readings taken by the machine operator 26 after the completion of each segment. For example, Segment 1 was completed at 11:06 AM on May 10, 1994. The segment has a bearing of 474,912.487 Northing and 1,427,068.001 Easting. The Grade is 32.649, Machine Azimuth is 4.852108 and Machine Slope is 0.013453. Upon completing Segment 1, the actual segment ring has a horizontal offset of 0.14 R and a vertical offset of 0.54 A.

From reviewing Table A and FIG. 10 it can easily be seen that the boring machine 10 continued to be right of the plan line 86 and in a range of 0.20 to 0.30 R until Segment 31. At this point the machine moved from the right of the plan line 86 to a 0.05 L horizontal offset position. The machine at this time continued through the remaining segments left of the plan line and in a range of 0.20 to 0.70 L horizontal offset.

Also, from reviewing Table A and FIG. 11 it can be seen that the boring machine 10 continues forward from Segment 1 above the plan line 86 and in a range of 0.50 to 0.70 A until Segment 21. At this position the machine then moves from above the plan line 86 downwardly to a 0.01 B vertical offset position. The machine then continues through the remaining segments either above or below the plan line and very close to the plan line 86.

ALIGNMENT OF LASER BEAM TRANSMITTER

In moving the laser beam transmitter 34, as mentioned in FIGS. 2 and 3 when the tunnel boring machine 10 reaches Point B, the front and rear targets 20 and 28 are read at the segment where the machine is located prior to moving the transmitter. In this example, the machine 10 has Segment No. 18 in the shield 15 as shown in graphic displays 92 and 94 in FIGS. 12 and 13. The transmitter 34 was initially installed at Segment 0.58 or roughly between 0 and Segment 1 and located 2.22 feet left of the segment centerline.

Figure 12:
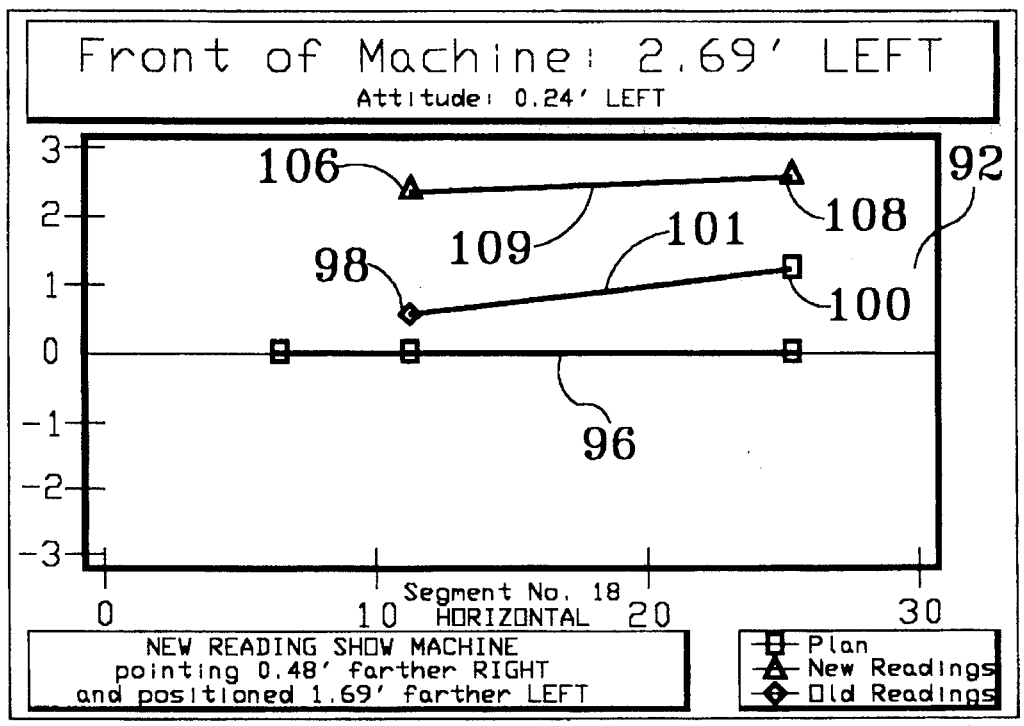
FIGS. 12 and 13 illustrate graphic displays of different positions of the front target and front of the tunnel boring machine based on target readings taken before and after a repositioning of the laser beam transmitter.

Referring to FIG. 12 and with the transmitter 34 at its initial position, the front target 20 has a position of 0.50 L or 0.50 feet left as indicated by triangular mark 98 and the front of the machine is positioned 1.00 L or 1.00 feet left of the plan line 96 as indicated by triangular mark 100. The two marks 98 and 100 form an actual reference line 101.

Figure 13:
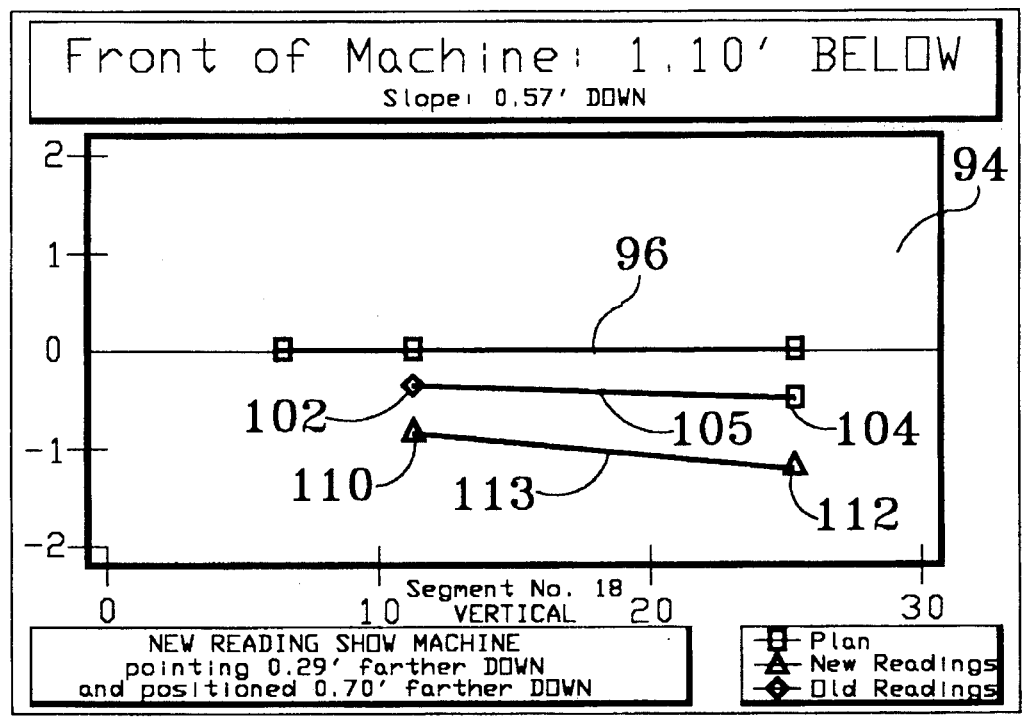

Referring now to FIG. 13 and with the transmitter 34 at its initial position, the front target 20 has a position of 0.20 B or 0.20 feet below the plan line 96 as indicated by triangular mark 102 and the front of the machine is positioned 0.40 B or 0.40 feet below the plan line as indicated by triangular mark 104. The two marks 102 and 104 form an actual reference line 105. When the transmitter 34 is moved to a new location, the laser light beam 36 will form a new actual reference line with the front target 20 and the front of the machine. This new actual reference line should correspond with the old actual reference lines 101 and 105 for proper alignment of the transmitter 34.

Referring back to FIG. 12 and when the transmitter 34 is moved from the 0.58 segment location to a new location, for example Segment 16, the front target 20 has a new position of 2.60 L or 2.60 feet left as indicated by triangular mark 106 and the front of the machine has a new calculated position of 2.80 L or 2.80 feet left of the plan line 96 as indicated by triangular mark 108. The two marks 106 and 108 form an new actual reference line 109. The new actual reference line 109 indicates that the front of the machine is now pointing 0.48 feet farther right and positioned 1.69 farther left when compared to the old actual reference line 101 which is impossible since the machine 10 has not moved. Obviously, the laser coordinates must be wrong and need to be checked. The new actual reference line 109 should correspond to the old reference line 101 for proper alignment.

Referring back to FIG. 13 and when the transmitter 34 is moved from the 0.58 segment location to Segment 16, the front target 20 has a new calculated position of 0.80 B or 0.80 feet below the plan line 96 as indicated by triangular mark 110 and the front of the machine has a calculated position of 1.00 B or 1.00 feet below the plan line 96 as indicated by triangular mark 112. The two marks 110 and 112 form a new actual reference line 113. The new actual reference line 113 indicates that the front of the machine is now pointing 0.29 feet farther down and positioned 0.70 farther down when compared to the old actual reference line 105 which is impossible since the machine 10 has not moved. Obviously, the new laser coordinates are wrong and need to be corrected so that the new actual reference line 113 corresponds to the old reference line 105 to insure that the new position calculations will be correct.

It should be mentioned that through the use of the computer 38, the plan line of the tunnel 11 is computed in the computer 38 based on the initial location of the targets on the boring machine 10, the above mentioned data as to coordinates, azimuth, slope, etc., the initial position of the laser beam transmitter 34 and the imputed target readings when each segment is completed. Therefore and by design, the operator 26 does not know where the plan line is by looking at the targets. Otherwise, if the operator 26 did know where the plan line is, it could cause him to try and calculate his position creating the possibility of human error. The subject system for guiding the boring machine 10 eliminates this possibility of machine operator error.

While the invention has been particularly shown, described and illustrated in detail with reference to the preferred embodiments and modifications thereof, it should be understood by those skilled in the art that the foregoing and other modifications are exemplary only, and that equivalent changes in form and detail may be made therein without departing from the true spirit and scope of the invention as claimed, except as precluded by the prior art.

The embodiments of the invention for which an exclusive privilege and property right is claimed are defined as follows:

1. A guidance system for keeping a tunnel boring machine on a plan line, the system comprising:

a light beam from a light beam source;

a front target mounted near the front of the tunnel boring machine, said light beam directed toward and impinging on said front target;

a rear target mounted near the rear of the tunnel boring machine, said light beam directed toward and impinging on said rear target;

computer means for imputing data for establishing the plan line of the tunnel boring machine and establishing an actual center line of the position of the tunnel boring machine by imputing periodic data as to offset measurements taken from readings on said front and rear targets; and display means generated by said computer means for comparing the plan line of the tunnel boring machine and the actual center line of the tunnel boring machine and taking corrective action if necessary as to repositioning the tunnel boring machine as it advances forward.

2. The system as described in claim 1 wherein said light beam is a laser light beam from a laser beam transmitter.

3. The system as described in claim 2 wherein said front and rear targets include horizontal and vertical cross-hairs thereon, said laser light beam directed toward and impinging on said front and rear targets.

4. The system as described in claim 1 wherein said computer means is an on-board programmable computer installed on the tunnel boring machine for imputing data for establishing the plan line and establishing an actual center line of the position of the tunnel boring machine by imputing periodic data as to horizontal and vertical offset measurements taken from the readings on said front and rear targets.

5. The system as described in claim 1 wherein said display means is a graphic display generated by said computer means of the plan line of the tunnel boring machine and the actual center line of the tunnel boring machine for comparing the two lines, said graphic display used as a guide in taking corrective action as to repositioning the tunnel boring machine as it advances forward.

6. The system as described in claim 1 wherein the actual center line of the position of the tunnel boring machine is established by imputing periodic data in increments, the increments data being offset horizontal and vertical measurements taken from readings on said front and rear targets.

7. A guidance system for keeping a tunnel boring machine on a plan line through a plurality of segments making up a tunnel, the system comprising:

a laser light beam from a laser beam source;

a front target with horizontal and vertical cross-hairs thereon, said front target mounted near the front of the tunnel boring machine, said laser light beam directed toward and impinging on said front target;

a rear target with horizontal and vertical cross-hairs thereon, said rear target mounted near the rear of the tunnel boring machine, said laser light beam directed toward and impinging on said rear target;

a on-board programmable computer installed on the tunnel boring machine for imputing data for establishing the plan line and establishing an actual center line of the position of the tunnel boring machine by imputing periodic data as to horizontal and vertical offset measurements taken from the readings on said front and rear targets for each segment; and a graphic display generated by said programmable computer of the plan line of the tunnel boring machine and the actual center line of the tunnel boring machine for comparing the two lines for each segment, said graphic display used as a guide in taking corrective action as to repositioning the tunnel boring machine as it advances forward toward a segment to be completed.

8. The system as described in claim 7 where a plurality of graphic displays are generated by said programmable computer of the plan line of the tunnel boring machine and the actual center line of the tunnel boring machine for comparing the two lines of one or more previous as-built segments with the current segment just completed.

9. The system as described in claim 7 where a plurality of graphic displays are generated by said programmable computer of the plan line of the tunnel boring machine and the actual center line of the tunnel boring machine for comparing the two lines of one or more to be built segments with the current segment just completed.

10. The system as described in claim 7 where a plurality of graphic displays are generated by said programmable computer of the plan line of the tunnel boring machine and the actual center line of the tunnel boring machine for comparing the two lines of one or more as-built segments, the two lines of one or more to be built segments with the two lines of the current segment just completed.

11. The system as described in claim 7 wherein a laser alignment graphic display is generated by said programmable computer of a first center line of the tunnel boring machine when taken by readings on said front and rear targets when said laser beam source is in a first position and comparing a second center line of the tunnel boring machine when taken by readings on said front and rear targets when said laser beam source is in a second position, said laser alignment graphic display determining if said first and second center lines correspond when moving said laser beam source.

12. A method of keeping a tunnel boring machine on a plan line through a plurality of segments making up a tunnel by using a graphic display generated by a programmable computer installed on the tunnel boring machine and using a laser light beam from a laser beam source and using a front target mounted near the front of the tunnel boring machine and a rear transparent target mounted near the rear of the tunnel boring machine, the steps comprising:

passing the laser light beam from the laser beam source located to the rear of the tunnel boring machine through the rear transparent target and onto the front target;

taking offset measurement readings for each segment on the front and rear targets;

imputing the offset measurement readings for each segment in the computer for establishing an actual center line of the position of the tunnel boring machine; and generating a graphic display from the computer of an actual center line and a plan line of the tunnel boring machine for comparing the two lines for each segment, said graphic display used as a guide in taking corrective action as to repositioning the tunnel boring machine as it advances forward toward a segment to be completed.

13. The method as described in claim 12 further including the step of generating a second graphic display by the programmable computer of the plan line of the tunnel boring machine and the actual center line of the tunnel boring machine for comparing the two lines of one or more previous as-built segments with the current segment just completed.

14. The method as described in claim 13 further including the step of generating a third graphic display by the programmable computer of the plan line of the tunnel boring machine and the actual center line of the tunnel boring machine for comparing the two lines of one or more to be built segments with the current segment just completed.

15. The method as described in claim 14 further including the step of generating a fourth graphic display by the programmable computer of the plan line of the tunnel boring machine and the actual center line of the tunnel boring machine for comparing the two lines of one or more as-built segments, the two lines of one or more to be built segments with the two lines of the current segment just completed.

16. The method as described in claim 12 further including the step of generating a laser alignment graphic display by the programmable computer of a first center line of the tunnel boring machine when taken by readings on said front and rear targets when said laser beam source is in a first position and comparing a second center line of the tunnel boring machine when taken by readings on said front and rear targets when said laser beam source is in a second position, said laser alignment graphic display determining if said first and second center lines correspond when moving said laser beam source.

17. A method of keeping a tunnel boring machine on a plan line through a plurality of segments making up a tunnel by using a graphic display generated by a programmable computer installed on the tunnel boring machine and using a laser light beam from a laser beam source and using a front target with horizontal and vertical cross-hairs mounted near the front of the tunnel boring machine and a rear transparent target with horizontal and vertical cross-hairs mounted near the rear of the tunnel boring machine, the steps comprising:

passing the laser light beam from the laser beam source located to the rear of the tunnel boring machine through the rear transparent target and onto the front target;

taking offset measurement readings measured from the horizontal and vertical cross-hairs on the front and rear targets for each segment;

imputing the offset measurement readings for each segment in the computer for establishing an actual center line of the position of the tunnel boring machine; and generating graphic displays from the computer of an actual center line and a plan line of the tunnel boring machine for comparing the two lines as to horizontal offset and vertical offset for each segment, said graphic displays used as a guide in taking corrective action as to repositioning the tunnel boring machine as to attitude and slope as it advances forward toward a segment to be completed.

18. The method as described in claim 17 further including the step of generating a second series of graphic displays by the programmable computer of the plan line of the tunnel boring machine and the actual center line of the tunnel boring machine as to horizontal and vertical offset for each segment and for comparing the two lines as to horizontal and vertical offset of one or more previous as-built segments with the current segment just completed.

19. The method as described in claim 18 further including the step of generating a third series of graphic displays by the programmable computer of the plan line of the tunnel boring machine and the actual center line of the tunnel boring machine as to horizontal and vertical offset for each segment and for comparing the two lines as to horizontal and vertical offset of one or more previous to be built segments with the current segment just completed.

20. The method as described in claim 19 further including the step of generating a fourth series of graphic displays by the programmable computer of the plan line of the tunnel boring machine and the actual center line of the tunnel boring machine as to horizontal and vertical offset for each segment and for comparing the two lines as to horizontal and vertical offset of one or more previous as-built segments and the two lines as to horizontal and vertical offset of one or more to be built segments with the two lines of the current segment just completed.

\* \* \* \* \*